United States Patent [19]

Davidson

[11] Patent Number: 5,305,010
[45] Date of Patent: Apr. 19, 1994

[54] CRYSTAL OSCILLATOR SYNCHRONIZED DIGITAL VERY HIGH FREQUENCY OMNI-RANGE (VOR) INSTRUMENTATION UNIT

[75] Inventor: Eldon F. Davidson, Folsom, Calif.

[73] Assignee: Wayne C. Clemens, Santa Ana, Calif.

[21] Appl. No.: 30,666

[22] Filed: Mar. 12, 1993

[51] Int. Cl.⁵ ............................ G01S 1/44; G01S 5/04
[52] U.S. Cl. .................................... 342/401; 342/404; 342/443
[58] Field of Search ................. 342/401, 404, 442, 443

[56] References Cited

U.S. PATENT DOCUMENTS

| | | | |
|---|---|---|---|
| 2,661,467 | 12/1953 | Jones | 343/106 |
| 3,386,096 | 5/1968 | Ludsfeen et al. | 343/106 |
| 3,495,248 | 2/1970 | Raether et al. | 343/106 |
| 3,653,047 | 3/1972 | Anthony | 343/106 R |
| 3,787,860 | 1/1974 | Greatline et al. | 343/106 R |
| 3,800,125 | 3/1974 | Cleary, Jr. | 235/150.2 |
| 3,838,427 | 9/1974 | King, Jr. et al. | 343/106 R |
| 3,845,484 | 10/1974 | Sawicki | 343/106 R |
| 3,919,706 | 11/1975 | Grimm et al. | 342/401 |
| 3,968,494 | 7/1976 | Freter | 343/106 R |
| 3,988,733 | 10/1976 | Kohler | 343/106 R |
| 4,212,067 | 7/1980 | Henderson | 342/401 |
| 4,604,625 | 8/1986 | Davidson | 343/401 |

OTHER PUBLICATIONS

George R. Sugar; "A VOR Audio frequency standard signal source based on digitial waveform synthesis", *1976 Conference on Precision Electromagnetic Measurements*, Boulder, Colo. (Jun. 28–Jul. 1, 1976) pp. 72–74.

Primary Examiner—Gregory C. Issing
Attorney, Agent, or Firm—Peter L. Michaelson

[57] ABSTRACT

A very high frequency omni-range (VOR) receiver for use in aircraft radio-navigation, which provides an indication of course deviation that is substantially immune to effects such as reflections in transmitted VOR signals, transients occurring in an aircraft's electrical system and propeller and/or rotor modulations of an incoming VOR signal and the like which are all unrelated to actual course deviation, is disclosed. The receiver phase synchronizes a signal from a 1.08 MHz crystal oscillator to a 30 Hz reference signal and a 30 Hz variable signal; both the reference and variable signals are received from a VOR ground station. As a result of the phase synchronization, the receiver produces timing pulses which are accurately phase synchronized to a synchronized reference pulse stream derived from the 30 Hz reference signal. Additionally, the receiver produces a synchronized variable pulse stream that is derived from the 30 Hz variable signal. The receiver produces, in response to the synchronized reference pulse stream and the timing pulses, a signal (henceforth referred to as the "OBS" signal) which is phase shifted by an amount representative of a selected radial emitted by that station. To facilitate determining deviations from the selected radial, the receiver determines any phase difference between the "OBS" signal and the synchronized variable pulse stream. This phase difference is used to produce a deviation signal having a value that represents any course deviations existing between the selected radial and a present magnetic course of the aircraft with respect to the VOR station.

16 Claims, 5 Drawing Sheets

CRYSTAL OSCILLATOR SYNCHRONIZED DIGITAL VERY HIGH FREQUENCY OMNI-RANGE (VOR) INSTRUMENTATION UNIT

BACKGROUND OF THE INVENTION

1. Field of the Invention

The invention relates to navigation receivers and, more particularly, to very high frequency omni-range (VOR) receivers commonly used for aircraft navigation.

2. Description of the Prior Art

Currently, a primary source of in-flight aircraft navigation information is provided through the very high frequency omni-range (VOR) system. This system is typically comprised of a plurality of VOR transmitters (stations) which are widely dispersed throughout a given geographic territory. Each station within this territory continuously transmits a modulated signal on a unique pre-assigned carrier frequency with respect to all the other stations in the territory.

For navigation purposes, a VOR signal is comprised of two components: a 30 Hz reference sinusoidal signal and a 30 Hz variable sinusoidal signal. The reference signal is transmitted omni-directionally from the VOR station, such that its phase remains constant anywhere along the periphery of a circle concentrically drawn at any radial distance outwardly from the station. Hence, for any two aircraft flying different magnetic course headings toward the station, i.e., located at a different point along the periphery of the circle, each aircraft receives the same reference signal as that of the other, that is without any phase difference existing therebetween. The variable signal is transmitted such that the amount of phase difference between it and the reference signal linearly varies from 0° to 360° along the periphery of any concentric circle centered about the station. The pattern of the variable signal is such that the phase difference at any point along the circle is determined by the magnetic bearing of that point measured from the station. For example, if an aircraft were to fly a magnetic heading of 0° from a VOR station, the reference and variable signals would be totally in phase; consequently, any phase difference existing therebetween would be 0°. If, alternatively, an aircraft were to fly a 90° magnetic heading from the station, the variable signal would then lag the reference signal by 90° resulting in a 90° phase difference existing therebetween. Likewise if an aircraft were to fly a magnetic heading of 216° from the VOR station, then there would be a 216° phase difference existing between the received variable and reference signals occurring at that point (and so on). It is this varying course dependent phase difference that provides the airborne navigation information.

A VOR receiver mounted in an aircraft and tuned to the carrier of a desired VOR station determines the difference then appearing between the reference and variable signals transmitted by that VOR station and, in response thereto, provides a visual indication of the magnetic course bearing then being flown with respect to that station. To minimize reception error in differentiating between the reference and variable signals, the VOR signal is transmitted with the reference signal frequency modulating a 9960 Hz subcarrier. This subcarrier and the variable signal each amplitude modulate the main VOR carrier by approximately 30%. In addition, aural identification of the VOR station is provided by a unique audible Morse Code signal that also modulates the main carrier.

To effectively indicate a present magnetic course, i.e., a particular VOR radial, a combined omni-bearing selector (OBS) and a left/right indicator were developed in the art for connection to the output of the VOR receiver. The OBS permits the pilot to select any magnetic course (from 0° to 360°) with respect to a particular selected VOR station, by simply turning a knob on the indicator until the selected magnetic course, i.e., the associated VOR radial, is indicated. The VOR receiver determines the actual radial that is then being flown and, in response to information regarding the selected course, generates a deviation voltage. This voltage is zero-valued whenever the aircraft is flying on the selected course. Or the voltage is positive or negative depending upon whether the aircraft is on one side of the selected course or the other. The deviation voltage is applied to an analog meter (left/right indicator) which indicates the course deviation as a left or right movement of its needle. Deviation information is presented such that whenever the OBS selector is set to the correct (non-reciprocal) magnetic course, any course deviations can be eliminated, i.e., the pilot can fly towards the correct course, by flying "into the direction" of the movement of the needle. For example, a left or right off-course indication can be corrected by turning the aircraft to the left or the right, respectively.

Well known VOR indicators of this type also include "To/From" indicator which specifies whether the course set through the OBS selector is in a direction that will take the pilot towards ("To") or away from ("From") the station. The "To/From" indicator is generally positioned in very close proximity to both the OBS selector and course deviation needle such that the pilot can easily perceive all three simultaneously.

In VOR receivers currently known to the art, two tuned circuits, one tuned to 9960 Hz and the other tuned to 30 Hz, are used to separate the reference and variable sinusoidal signals from the main VOR carrier. Each separated signal is then applied, through appropriate limiters and detectors, to an appropriate input of a phase detector. The phase detector produces the deviation voltage which is then applied through an amplifier to drive the left/right and "To/From" indicators.

Unfortunately, the phase detector used in presently existing VOR receivers is highly susceptible to both amplitude and phase variations occurring between its two input (reference and variable) signals. These variations are often produced by factors unrelated to actual course deviations —such as for example reflected VOR signals, transient voltages occurring within the aircraft, weak VOR signals, or amplitude modulations imparted to the received VOR signal caused by movement of the aircraft's propeller or rotor —and thus produce erroneous course deviation indications on the left/right needle.

Specifically, reflections of VOR signals are often caused by the physical surroundings of the VOR station, and specifically by the presence of man-made objects such as buildings, power lines, bridges and/or terrain anomalies. Inasmuch as these effects are quite common and frequently occur near most VOR stations, reflected signals often reach an airborne VOR receiver at all phase angles and with an amplitude that varies as the aircraft flies along any selected radial. These reflections, in turn, cause an amplitude variation between the received reference and variable signals and also corrupt the correct phase relationship occurring therebetween.

It is well known that the physical environment around any VOR station causes the amount of received VOR signal attributable to reflections to vary from point to point along any radial emitted by that station. Moreover, the differences in the physical environments associated with any two VOR stations usually results in differing amounts of reflections for points along any particular radial of one station with respect to identically situated points associated with the other station. Therefore, the received VOR signal at most points along any radial from any VOR station usually contains a signal portion attributable to reflections. This signal portion usually produces some error in the course deviation indication produced by the VOR receiver.

One possible solution to minimizing reflection-based errors is to store a table of correction factors within the VOR receiver. Each correction factor would be accessed by both the radial selected by the OBS selector and the radial distance from the present position of the aircraft to the VOR station. The accessed correction factor would be used to offset the left/right indication to compensate for the expected reflection occurring at that position. Unfortunately, the number of separate correction factors needed for one VOR station can be substantial. Since such information in all likelihood would be required for a plurality of stations, memory requirements to accommodate such a table can be quite significant. Hence, the resultant circuitry of the VOR receiver would likely become disadvantageously complex, bulky and excessively expensive. Moreover, since the physical environments around VOR stations are apt to change from time to time, as a result of, for example, new structures or man-made modifications to nearby terrain, any such table would, of necessity, require updating which would, in turn, further disadvantageously escalate the cost of the VOR receiver.

An alternate solution, particularly with the advent of increasingly sophisticated micro-processors, might appear at first glance to lie in storing data relating to the physical environment of a particular VOR station and then calculating the necessary correction factor for each point on an aircraft's path along a radial emitted from that station and using the result to appropriately correct the left/right needle indication. However, the immense complexity associated with such a calculation (both in terms of the mathematics involved as well as the substantial processing time required) effectively eliminates this solution as a viable possibility.

Consequently, presently existing VOR receivers known to the art are generally devoid of any provision to eliminate commonplace and substantial course deviation errors attributable to reflected VOR signals. Therefore, since the inception of the VOR radio navigation system, the aviation community has come to rely on the Federal Aviation Administration (FAA) to judiciously select sites for VOR stations in which the physical environment of each is least likely to produce reflections. Unfortunately, every site produces some reflections and thus necessitates substantial expenditures of time —including flight checks, and money —in assessing its suitability for a VOR station. As an expedient in selecting sites, the FAA has developed standards for maximum amounts of course deviation error which under various categories of VOR use can be safely tolerated for any VOR station. Hence, every pilot learns to disadvantageously accept a certain amount of error in radio navigating with regard to any VOR radial.

A further deficiency of presently existing VOR receivers involves the so-called "cone of confusion." In particular, whenever an aircraft is very close to a VOR station, the "To/From" indicator fluctuates wildly and the left/right needle rapidly moves back and forth from one extreme point of its travel to the other. The region above a VOR station in which these indications occur generally resembles an inverted cone with the VOR station at its apex. With presently existing VOR receivers, the sides of the cone are inclined with respect to its vertical axis at angles of approximately 30°. The width of the cone varies with altitude and normally extends for several miles at an altitude of several thousand feet above any VOR station. While these indications are used by the pilot as an "over-station" indication, these indications, due to the varying altitude dependent width of the cone, disadvantageously provide no accurate indication of the exact point in time when the aircraft is directly over the VOR station.

SUMMARY OF THE INVENTION

Accordingly, an object of the present invention is to provide an extremely accurate VOR receiver for use in aircraft radio navigation.

A particular object is to provide such a receiver which generates course deviation indications for any VOR station and any VOR radial that are substantially unaffected by all the factors other than actual course deviations.

A more particular object of this invention is to provide such a receiver having a response which is substantially immune to any reflected VOR signals.

Another more particular object is to provide such a response which is substantially unaffected by any other factors, such as transient voltages and modulations caused by a propeller or rotor, which are all unrelated to actual course deviations.

Another particular object is to generate an accurate indication of the point in time whenever the aircraft is directly over any VOR station, thereby minimizing the size of the "cone of confusion."

A further object is to provide such a receiver which is simple, easy to construct, and extremely inexpensive.

Another object is to substantially reduce the time, effort and money required in assessing the suitability of a site for a VOR station.

Another more particular object is to significantly minimize the need to select VOR station sites based upon the amount of reflections caused by their physical environment.

These and other objects are accomplished in accordance with the present invention by phase synchronizing a signal from a 1.08 MHz crystal oscillator to a 30 Hz reference signal and a 30 Hz variable signal. Both the reference and variable signals are received from a VOR ground station. As a result of the phase synchronization, my invention produces timing pulses which are accurately phase synchronized to a 30 Hz reference signal pulse stream derived from the 30 Hz reference signal. Additionally, my invention produces a 30 Hz variable signal pulse stream that is derived from the 30 Hz variable signal. My invention produces, in response to the 30 Hz reference signal pulse stream and the timing pulses, a signal (henceforth referred to as the "OBS" signal) which is phase shifted by an amount representative of a selected radial emitted by that station. To facilitate determining deviations from the selected radial, my invention determines any phase difference between the "OBS" signal and the 30 Hz variable signal pulse stream. This phase difference is used to produce a deviation signal having a value that represents any course deviations existing between the selected radial and the present magnetic course of the aircraft with respect to the VOR station. Advantageously, the value of the deviation signal is only affected by course deviations and is substantially immune to any reflections, and other effects, such as transients within the aircraft and/or rotor and propeller modulation of an incoming VOR signal, which are all unrelated to actual course deviations.

Specifically, in accordance with a preferred embodiment disclosed herein, the reference and variable 30 Hz sinusoidal signals are both extracted from a main VOR carrier and are appropriately limited to yield two pulse streams: one corresponding to the reference signal and the other corresponding to the variable signal. The 30 Hz reference and variable pulse streams are phase synchronized to a 30 Hz signal which results from down counting a 1.08 MHz crystal oscillator 36,000 times. Prior to phase synchronizing the 30 Hz reference and variable pulse streams to the 30 Hz signal from the crystal oscillator, the periods of the 30 Hz reference and variable pulse streams are averaged for 16 intervals. The digital averaging technique reduces the effects of noise impulses from weak signals and multipath errors from strong signals. The technique provides very stable 30 Hz reference and variable pulses for further processing.

Additionally, the 1.08 MHz crystal oscillator is counted down 100 times to generate a 10.8 kHz timing signal. This timing signal is phase synchronized to the 30 Hz reference signal pulse stream. Consequently, one Hz of this signal represents a 1° variation in the VOR signal. This provides an extremely accurate timing signal which is phase-locked to the reference signal. Digital information, representing the desired magnetic course (radial) is fed to three counters which decrement this information to zero starting at the occurrence of a pulse in the reference signal pulse stream and continuing at a rate determined by the timing signal. When the count reaches zero, a pulse (henceforth referred to as the "OBS" pulse) is produced. The phase difference (in degrees) between this pulse and the most recently occurring reference signal pulse is indicative of the selected course. The phase difference between the OBS signal and the variable signal pulse stream is then determined by a phase (coincidence) detector, which produces a deviation signal in response thereto. This deviation signal is appropriately integrated and amplified, and thereafter applied to drive an appropriate indicator which has been properly labeled to show left/right course deviations.

Additional circuitry is included to numerically display the actual radial that is presently being flown and also to provide an accurate visual "To/From" indication. These circuits use the timing signal to accurately determine various phase relationships between the reference signal pulse stream, the variable signal pulse stream and/or the OBS signal.

Since all the indications (course deviation, actual course, and "To/From") produced by a VOR receiver embodying the teachings of the present invention are substantially and essentially determined by phase information alone, such a receiver is substantially immune and its indications are substantially unaffected by any amplitude variations, illustratively caused by reflections, transients and the like, in an incoming VOR signal.

BRIEF DESCRIPTION OF THE DRAWINGS

The invention may be clearly understood from a consideration of the following detailed description and accompanying drawings in which.

To facilitate easy understanding, identical reference numerals are used to denote elements which are common to various figures.

DETAILED DESCRIPTION

Any very high frequency omni-range (VOR) station transmits a main carrier modulated with two signals, the so-called reference and variable signals. The two modulating signals are used in radio-navigation. The reference signal is a 30 Hz sine wave which is radiated omnidirectionally from the station such that its phase is constant anywhere around the station. By contrast, the variable signal is also a 30 Hz sine wave but is transmitted in such a fashion that its phase value linearly varies around the station, i.e., aircraft located at different magnetic bearings (radials) from the station will receive the variable signal with different phase relationships with respect to the received 30 Hz reference signal. It is this linearly changing phase information between the reference and variable signals that provides airborne VOR radio-navigation information.

In order for a VOR receiver to effectively differentiate and separate the 30 Hz reference and variable signals from the main carrier, a different modulation technique is commonly used with respect to each signal. Specifically, the reference signal is frequency modulated (FM) onto a 9960 Hz subcarrier which, in turn, amplitude modulates (AM) the main VOR carrier by a pre-set amount, typically 30%. The 30 Hz variable signal is used to directly amplitude modulate the main VOR carrier, also by typically 30%. As will be discussed in greater detail shortly, the phase and/or amplitude of the reference and/or variable signals are usually corrupted by variations unrelated to actual course deviations and illustratively attributable to reflections of the transmitted VOR signal, transients occurring in the aircraft's electrical system, propeller and/or rotor modulation of an incoming VOR signal and the like.

Figure 1:
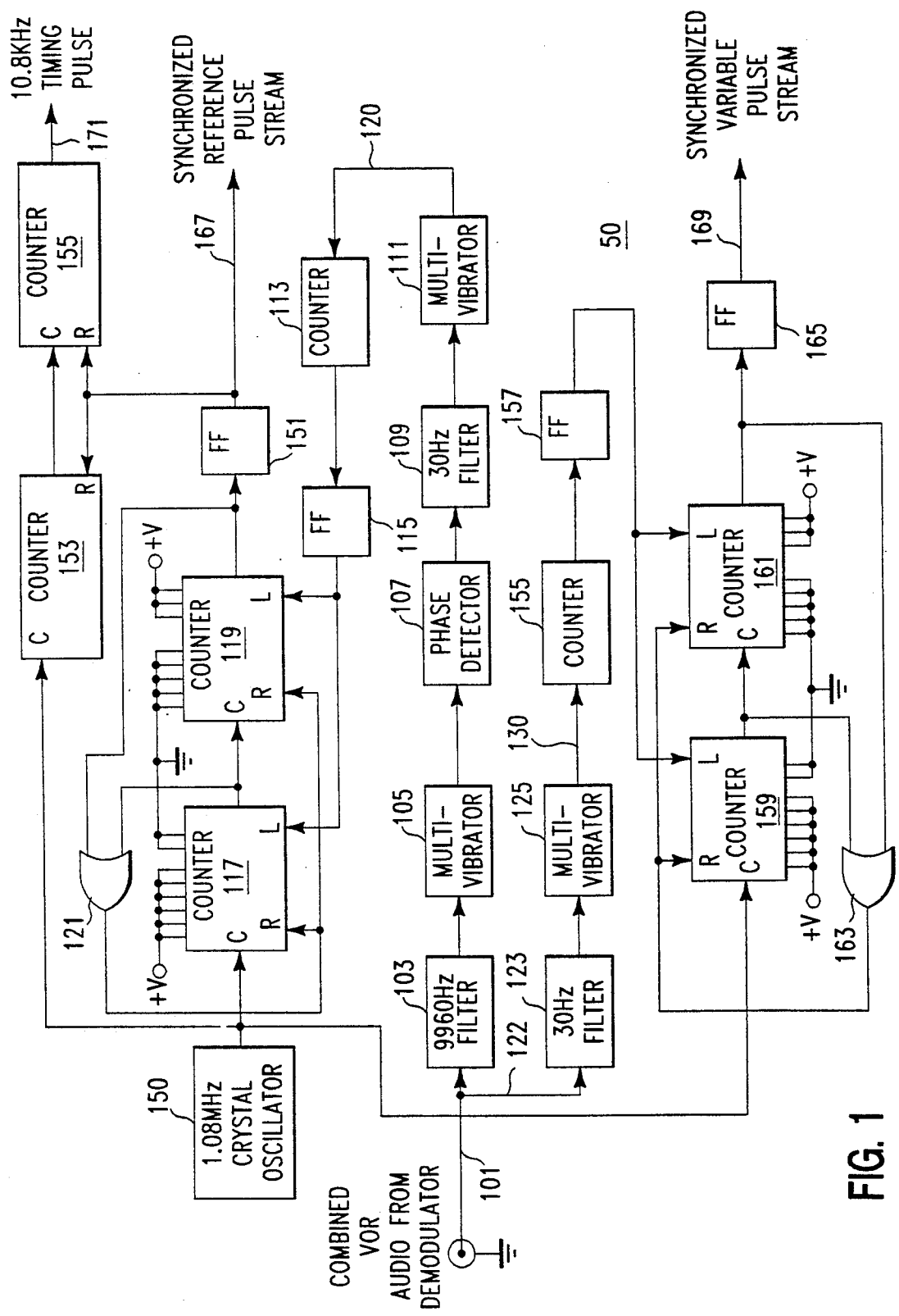
FIG. 1 is a block diagram of a portion of the circuitry of a very high frequency (VOR) omni-range receiver embodying the principles of my invention and, more particularly, showing timing signal generation circuitry 50 used therein.

Within most VOR receivers known to the art, the incoming VOR signal is first demodulated to remove the main carrier and leave the combined reference and variable signals in the audio frequency range (combined VOR audio signal). Thereafter, as shown in FIG. 1, the combined VOR audio signal is applied over leads 101 and 122 to two tuned circuits, bandpass filter 103 tuned to 9960 Hz and bandpass filter 123 tuned to 30 Hz. These filters separate the desired reference and variable 30 Hz sine waves from the combined VOR audio signal. The output signal produced by bandpass filter 103 is applied to multivibrator 105 which, in turn, removes all unwanted amplitude variations caused by, for example, reflections occurring in this signal. Thereafter, the output of multivibrator 105 is applied through phase detector 107, 30 Hz filter 109 and multivibrator 111 which together extract the 30 Hz reference sine wave from the 9960 Hz FM subcarrier and convert that 30 Hz reference sine wave into a 30 Hz reference pulse stream. The resultant 30 Hz reference signal pulse stream is then applied, via lead 120, to counter 113.

In most VOR receivers known to the art, the separated 30 Hz reference and variable signals (occurring at the outputs of bandpass filters 109 and 123) are then amplified by highly linear amplifiers (not shown) to a sufficient level to drive an appropriate indicator which shows course deviation. While any amplitude variations occurring in the 30 Hz reference signal have been removed by multivibrator 105, unwanted amplitude variations, caused by for example reflections, will exist in the 30 Hz variable signal appearing at the output of bandpass filter 123. These variations, when amplified, disadvantageously cause erroneous deviation indications.

In accordance with the teachings of the present invention, these erroneous course deviation indications caused by various signal reflections are reduced by first separating the reference and variable signals, digital averaging 16 periods of these signals, and phase synchronizing the reference and variable signals to a 30 Hz square wave signal. The 30 Hz square wave signal is derived by down-counting (by 36,000 counts) a 1.08 MHz signal from a crystal oscillator. As a result, my invention produces a very stable synchronized reference pulse stream corresponding to the 30 Hz reference signal pulse stream and a synchronized variable pulse stream corresponding to the 30 Hz variable signal pulse stream. The time between the pulses in these pulse streams is directly related to the present course to or from the VOR ground station. As such, these pulse streams are supplied to circuits which accurately determine the phase relationships existing between the reference and variable signals by measuring the interval between pulses in the respective synchronized pulse streams. Consequently, my invention displays highly accurate course deviation and other navigation information in response to these phase differences.

Specifically, the 30 Hz reference pulse stream appearing at the output multivibrator 111 produces a pulse on lead 120 having an illustrative, approximate width of 5 μseconds whenever, for example, a positive-going level change occurs in the 30 Hz reference sine wave.

The 30 Hz variable sine wave is applied through similar circuits, i.e., 30 Hz bandpass filter 123, multivibrator 125 to produce similar 5 μseconds pulses on lead 130. Advantageously, these pulses are substantially unaffected by any amplitude variations occurring in the 30 Hz variable signal. Consequently, both the 30 Hz variable signal pulse stream appearing on lead 130 and the 30 Hz reference signal pulse stream appearing on lead 120 are both substantially unaffected by amplitude variations caused in the variable signal, the reference signal, or both.

To remove signal jitter caused by multipath, counter 113 divides the reference pulse stream by 16. As such, the interval-to-interval fluctuations between pulses in the reference pulse stream are averaged over 16 pulses. As such, every 0.5333 seconds an output of counter 113 is sent to flip-flop 115. Alternatively, counter 113 can be adapted to count any number of times before producing an output. In this manner, the 30 Hz reference signal pulse stream can be averaged over any duration established by counter 113. For purposes of illustration, the count is set to 16. In response to the counter output, flip-flop 115 produces a relatively short pulse each 0.5333 seconds. This short pulse is applied to a "load" command line for counters 117 and 119. These counters are connected serially. At the occurrence of the short pulse, the counters load an initial count of 35,999 into their registers. Counter 117 is supplied with a 1.08 MHz signal from crystal oscillator 150. As such, the counters, as a combination, will count down from 35,999 to zero. Upon reaching the count of zero, if not re-loaded by a "load" command beforehand, the count will start again at 35,999. The rollover is facilitated by having an output of each counter as an input to OR gate 121. The OR function of OR gate 121 combines the outputs of the counters and is used to reset the counters when they reach a zero count. As connected, the counters count down from 35,999 to zero in response to each cycle of the 1.08 MHz signal. As such, the counters divide the 1.08 MHz signal by 36,000 resulting in a 30 Hz pulse stream at the output of counter 119. The output of counter 119 is applied to flip-flop 151 each time the counters are loaded or reset. As such, the output from counter 119 is phase synchronized to the digitally averaged 30 Hz reference signal pulse stream. Thus, the output of flip-flop 151 is a synchronized 30 Hz reference signal pulse stream (hereinafter referred to as a synchronized reference pulse stream). By pulsing the "load" command line with the short pulse from flip-flop 115, the synchronized reference pulse stream is synchronized to a digitized and averaged 30 Hz VOR reference signal. The synchronized reference pulse stream exits the circuit on lead 167.

Additionally, serially connected counters 153 and 155 divide the 1.08 MHz signal by 100 to produce a 10.8 kHz timing signal, i.e., a signal that is 360 times the reference signal frequency. The synchronized reference pulse stream resets counter 153 and 155 at a 30 Hz interval to ensure that the 10.8 KHz signal is synchronized to the 30 Hz reference signal, i.e., phase locked. The timing pulses exit the circuit on lead 171. With such a phase lock and with a frequency of 360 times that of both the reference and variable signals, then advantageously the exact count of the number of timing signal pulses occurring between a synchronized variable pulse on lead 169 and a synchronized reference pulse on lead 167 exactly equals the phase difference in degrees between the variable and reference VOR signals.

Additionally, the 30 Hz variable pulse stream on lead 130 is processed in the same manner as the 30 Hz reference signal to derive a synchronized variable pulse stream that is synchronized to the 1.08 MHz signal. As previously described, pulse jitter is removed by counter 155 which illustratively divides the variable pulse stream by 16. Flip-flop 157 converts an output of counter 155 into a relatively short pulse used as a "load" command to counters 159 and 161. Upon each "load"

command, the counters reset to a count of 35,999 and begin counting down at each cycle of the 1.08 MHz signal. The counters rollover from zero to 35,999 because of OR gate 163. At each transition of the output of counter 161, i.e., when the count is reset to 35,999 by either rollover or a "load" command, flip-flop 165 produces a pulse. The collective stream of pulses from flip-flop 165 forms a synchronized 30 Hz variable signal pulse stream (hereinafter referred to as a synchronized variable pulse stream). The synchronized variable pulse stream exits the circuit on lead 169.

Course deviations are determined, in accordance with the present invention, by accurately ascertaining the phase difference between the synchronized variable and synchronized reference pulse streams.

Figure 2:
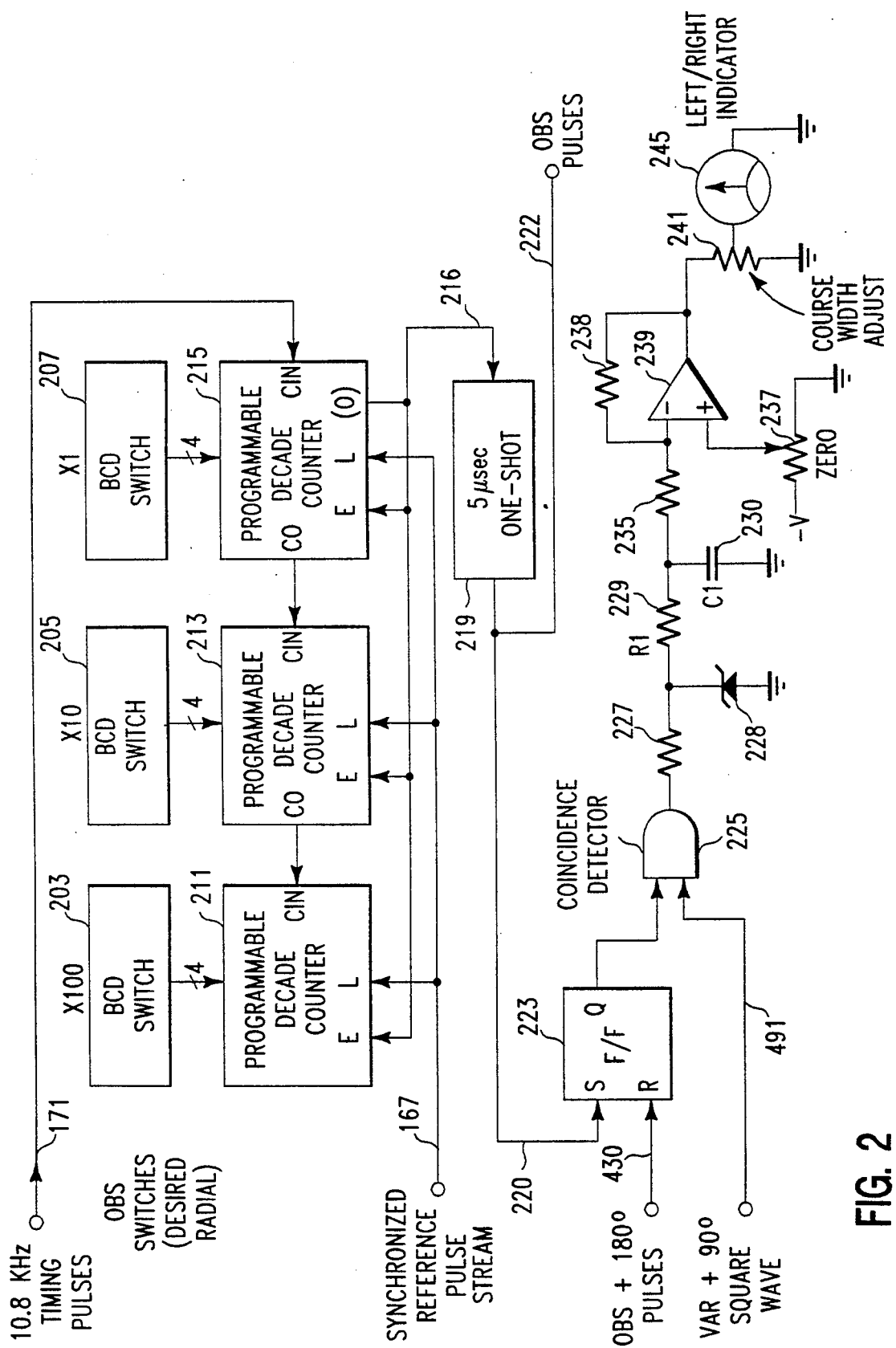
FIG. 2 is a block diagram of circuitry, used in conjunction with that shown in FIGS. 1 and 4, for displaying course deviation indications in accordance with the teachings of the present invention.

A block diagram of the circuitry, used in conjunction with that shown in FIG. 1, for displaying course deviation information is shown in FIG. 2. Specifically, a desired magnetic radial emitted by a VOR station is selected by a pilot by appropriately setting BCD (binary coded decimal) switches (illustratively thumbwheels) 203, 205 and 207. These switches are referred to as the "OBS" (omni-bearing) selector switches. The 4-bit BCD digital outputs produced by each thumbwheel are fed in parallel to parallel inputs of an associated programmable decade counter, i.e., counters 211, 213 and 215, which are illustratively CMOS type 4522 programmable counters. Each one of the synchronized reference pulses appearing on lead 167 causes these digital outputs to be loaded into the three decade counters. Thereafter, these counters decrement their contents by one at the occurrence of each pulse in the 10.8 kHz timing signal appearing on lead 171. Whenever the contents of these counters reach zero, the "(0)" output of counter 215 changes state, i.e., from low to high. By virtue of the connection of the (0) output to the enable ("E") input of all the counters, further decrementation is prevented. The positive going output provided by the (0) output is applied as input to one-shot (mono-stable multivibrator) 219 which, in response thereto, generates a positive pulse having a width of preferably 5 μseconds. This pulse is applied to lead 220 and also to lead 222 as "OBS" pulses. The phase delay between the occurrence of a synchronized reference pulse and the next successive "OBS" pulse is equal to the selected radial in degrees set on the OBS switches.

The 5 μseconds pulse appearing on lead 220 is applied to the set (S) input of flip-flop 223 which, in turn, sets its Q output to a high state. This output is applied to one input of AND gate 225 which functions as a coincidence detector and is enabled thereby. Flip-flop 223 remains in a set condition (Q output high) until an "OBS+180°" pulse occurs on lead 430. This pulse is discussed later in conjunction with FIG. 4. Coincidence detector (AND gate) 225 determines the coincidence between the signal produced at the Q output of flip-flop 223 and the "VAR+90°" square wave appearing on lead 491 (and discussed in conjunction with FIG. 4 below). The output of this detector —the deviation voltage —varies in duty cycle from 0 to 50% as discussed in greater detail below.

Advantageously, coincidence detector 225 does not respond to any amplitude variations occurring in the 30 Hz variable signal. Consequently, this substantially eliminates all adverse effects on course deviation indications produced by reflections, transients in the aircraft's electrical system, propeller and/or rotor modulations and other similar effects. Specifically, reduction of erroneous course deviation information is greatest whenever the reflected VOR signal is either in-phase or 180° out-of-phase with respect to the non-reflected VOR signal. At these phase relationships, any amplitude variations in the 30 Hz variable signal merely change the amplitude of the 30 Hz variable signal detected by the VOR receiver and do not impart any phase difference to it. Since the time relationship (phase difference) between the main and synchronized reference pulses does not change, the output of coincidence detector 225 is unaffected by these reflections.

The variable duty cycle output produced by coincidence detector 225 is limited through resistor 227 and zener diode 228 to approximately 4 volts (the zener voltage). The resulting limited voltage is then integrated by resistor 229 and capacitor 230, by appropriate selection of the values $R_1$ and $C_1$ of the resistor and capacitor respectively, into an approximate DC level. This level is amplified by amplifier 239 into a level sufficient to drive left/right (galvanometer) indicator 245. The values of resistor 235 and 238 are chosen to set the gain of amplifier 239 to a desired value. Potentiometer 237 is adjusted, preferably during calibration of the VOR receiver, to appropriately zero the output of amplifier 239 when the VOR receiver is receiving a VOR navigation signal which is the same as the OBS switches set to 0°. In addition, this adjustment also compensates for any offsets in amplifier 239. The setting of "course width" potentiometer 241 determines the sensitivity of left/right indicator 245 to course deviations.

Figure 5:
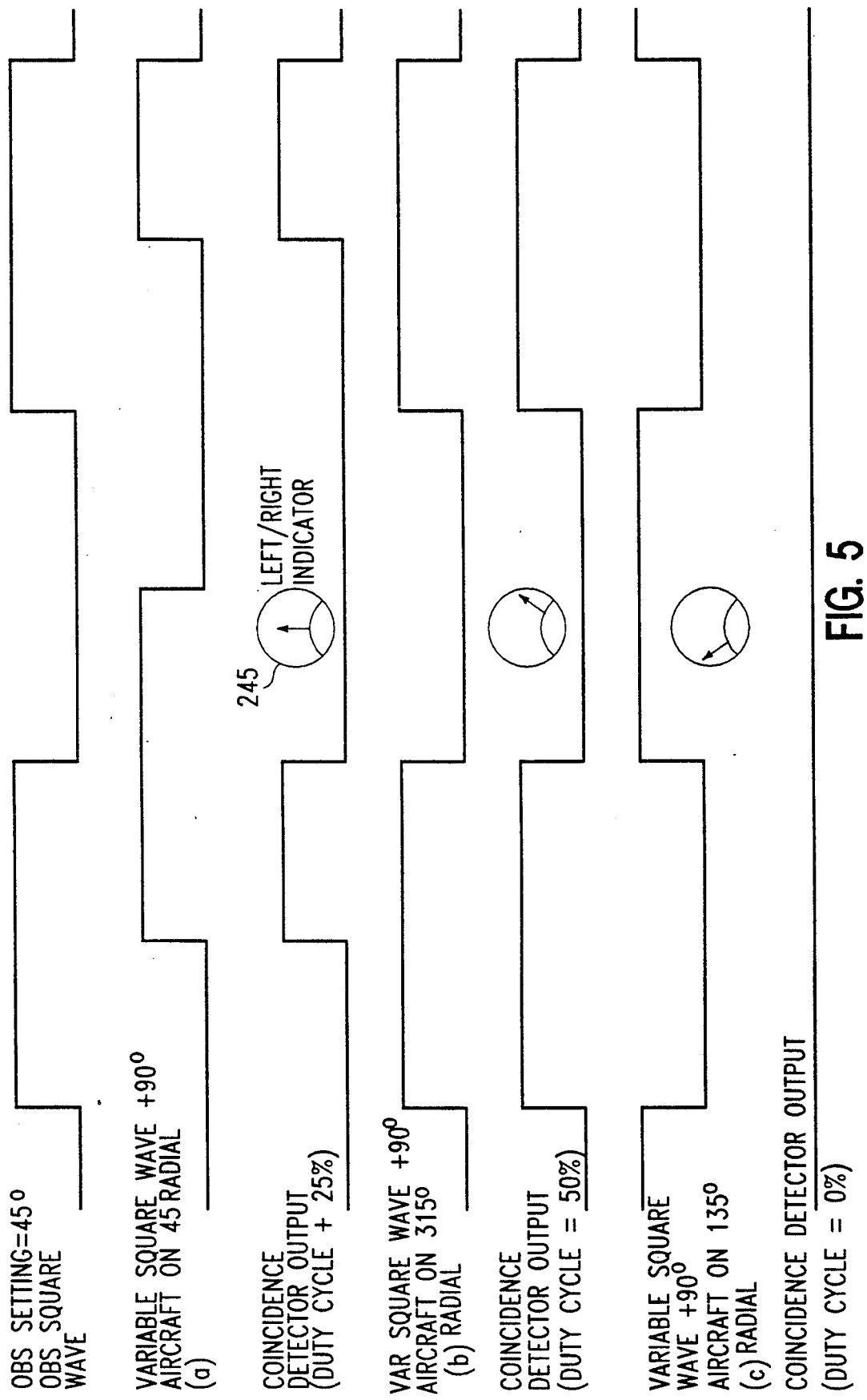
FIG. 5 is a sketch of various waveforms taken at selected points in the circuitry shown in FIG. 2.

Illustrative waveforms, depicting the operation of the circuitry shown in FIG. 2, are shown in FIG. 5. With the OBS switches for a selected radial of 45° and with the aircraft flying along this radial, the output of coincidence detector 225 is as shown in waveforms (a), a square wave having an approximately 25% duty cycle. This produces a zero course deviation indication (i.e., needle is at the middle of its total travel) on left/right indicator 245 because at this point the integrated dc level of this voltage produced by the coincidence detector equals the voltage from the zero potentiometer connected to the + input amplifier 239. Alternatively, if the selected radial is to the right of the aircraft, as in waveforms (b) wherein the aircraft is flying along a 315° radial from the VOR station and the OBS selector is set for the 45° radial, then the output of the coincidence detector is a square wave with a 50% duty cycle. When integrated, the waveform possesses approximately twice the amplitude of that shown for the integrated detector output for waveforms (a). Consequently, the left/right indicator produces a maximum indication to the right signifying that the pilot should sharply fly to the right in order to intercept the selected 45° radial. Lastly, if the selected radial is to the left of the aircraft, as in waveforms (c) where the aircraft is flying along a 135° radial from the station with a selected radial of 45°, then the output of the coincidence detector is zero. This causes a voltage of opposite polarity to be applied to left/right indicator 245 which, in turn, produces a maximum indication to the left thereby signifying that the pilot should sharply fly to the left to intercept the selected 45° radial.

Empirical tests performed on a VOR receiver embodying the teachings of the present invention have confirmed its substantial immunity to reflected signals. Specifically, a simulated reflected VOR signal having a phase difference of either +90° or −90° was injected along with a simulated non-reflected VOR signal into the receiver. With the reflected signal set to a signal level of −30 db below that of the non-reflected signal, the left/right needle indicated a maximum course deviation of ±0.5° error as the phase of the reflected signal was changed from +90° to −90°. This error decreased as the level of the reflected signal was reduced. With the level of the reflected signal set at −40 db down from the non-reflected signal, zero error was indicated on the course deviation indicator. Zero error was also advantageously indicated whenever the phase difference was set to either 0° or 180°, with the level of the reflected signal set to either 30 or 40 db down from that of the non-reflected signal.

Figure 3:
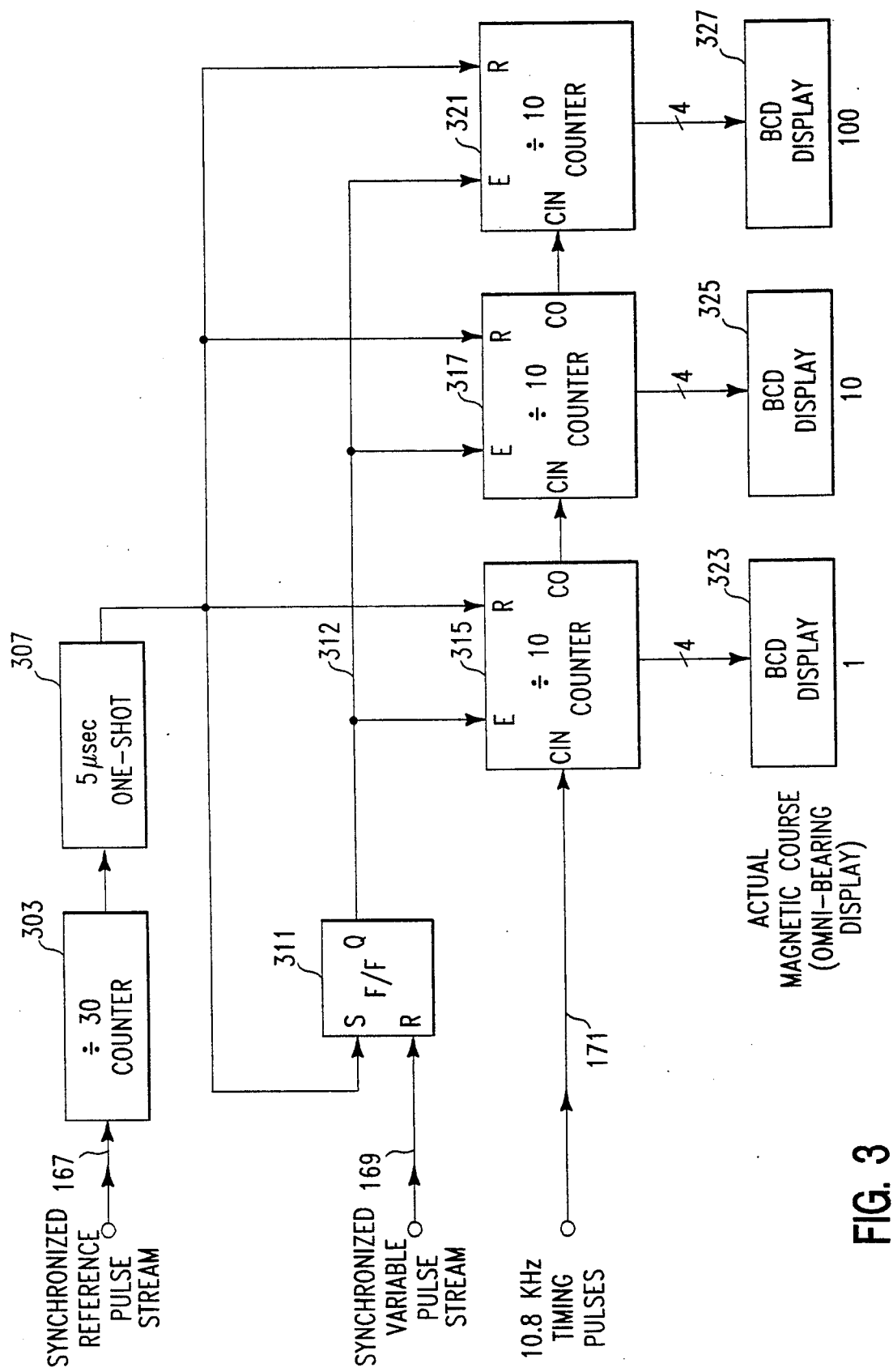
FIG. 3 is a block diagram of circuitry, used in conjunction with the circuitry shown in FIG. 1, for displaying the present course (omni-bearing) information in accordance with the teachings of the present invention.

A block diagram of the circuitry, used in conjunction with that shown in FIG. 1, for indicating the present radial ("omni-bearing") being received from a selected VOR station is shown in FIG. 3. Each of the synchronized reference pulses is applied over lead 167 to ÷30 counter 303 which, with a 30 Hz input frequency, produces an output pulse once per second, for updating the BCD omni-bearing display. Each pulse produced by counter 307 is, in turn, applied to the input of one-shot (mono-stable multivibrator) 307 which, in response thereto, produces a pulse of approximately and preferably 5 μseconds in width.

The 5 μseconds pulse is applied to the set (S) input of flip-flop 311 which, in turn, changes the state of its Q output to a high level. This 5 μseconds pulse is also applied to the reset inputs ("R") of ÷10 counters 315, 317 and 321 to simultaneously reset the contents of all these counters to zero. The high level on the Q output of flip-flop 311 is applied to the enable ("E") inputs of all these counters to permit them to begin counting up from zero. Thereafter, each pulse comprising the 10.8 kHz timing signal, appearing on lead 171, causes these counters to increment their contents by 1. This incrementation continues until the next successive synchronized variable pulse appears on lead 169. This variable pulse is applied to the reset ("R") input of flip-flop 311 which, in turn, causes the Q output of this flip-flop to return to a low state. This disables the three counters thereby preventing any further counting until one-shot 307 produces the next 5 μseconds pulse at which point this cycle repeats. At the end of each counting interval, counters 315, 317 and 321 contain a BCD value which equals the actual phase difference (in degrees) between the incoming 30 Hz reference and variable signals transmitted by the selected VOR station. This information corresponds to the actual radial ("omni-bearing") that is presently being received from the VOR station. This information is then applied in parallel fashion to three BCD displays 323, 325 and 327 which simultaneously and visibly display the omni-bearing information for the pilot's use. With three counters and displays and with the frequency of the timing signal set to 360 times the reference (and variable) sine waves, an accuracy of 1° is provided in the displayed omni-bearing information.

Figure 4:
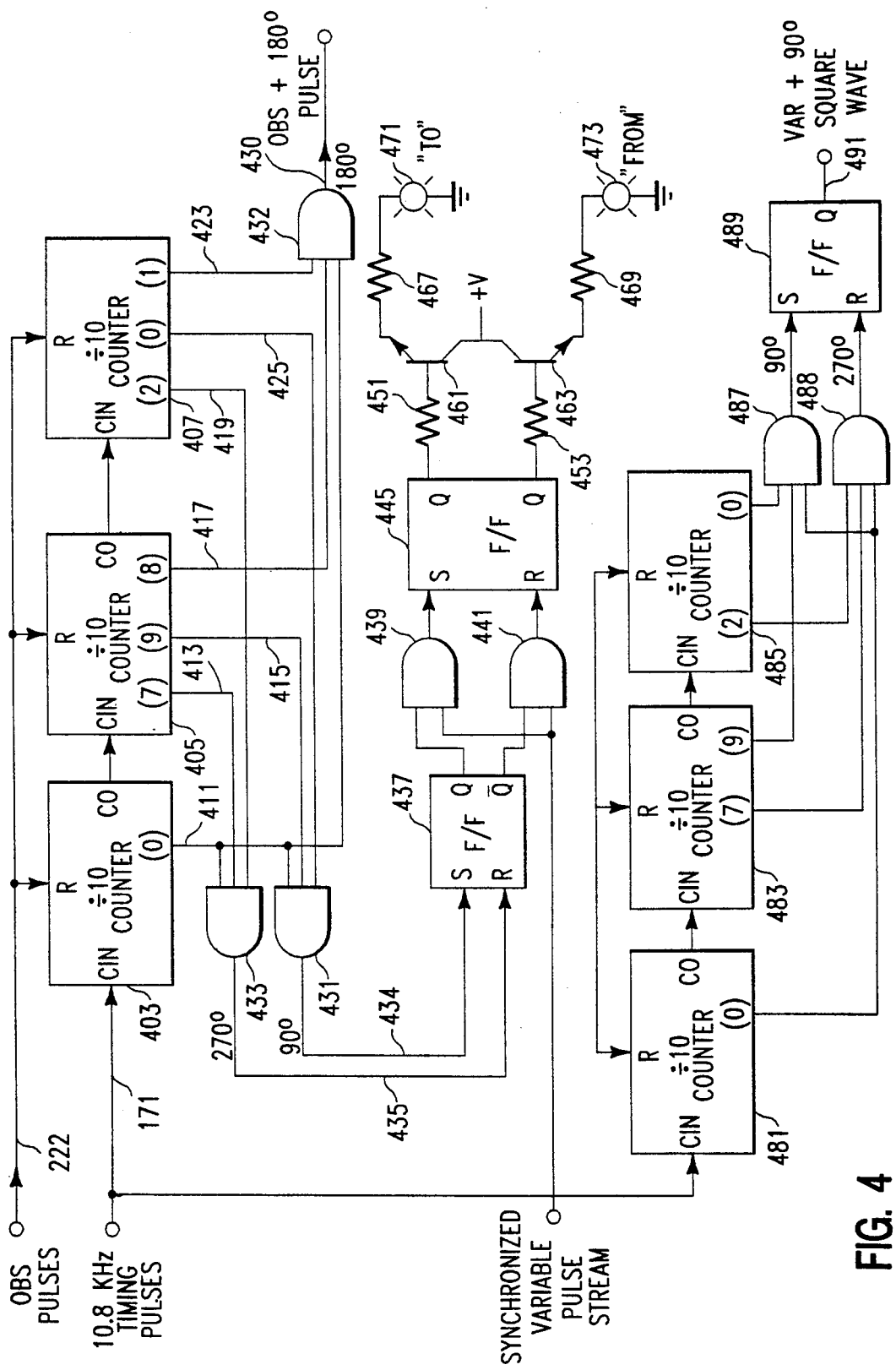
FIG. 4 is a block diagram of circuitry, used in conjunction with that shown in FIGS. 1 and 2, for displaying "To/From" indications in accordance with the teachings of the present invention.

Lastly, a block diagram of the circuit, used in conjunction with the circuitry shown in FIGS. 1 and 2 for providing a visual "To/From" indication is shown in FIG. 4. Each "OBS pulse" produced by the circuitry shown in FIG. 2 and applied to lead 222, is routed to the reset input of each of three ÷10 BCD counters, i.e., counters 403, 405 and 407 which are all preferably CMOS type 4017 counters. At the occurrence of each pulse, the contents of all of these counters are simultaneously reset to zero. Thereafter, each successively occurring pulse comprising the 10.8 kHz timing signal, appearing on lead 171, causes these BCD counters to increment the total count (appearing in all three) by one. Each BCD counter contains a decade decoder which provides separate outputs for each numerical value, 0 through 9, that can be stored in the counter. Three AND gates, specifically AND gates 431, 432 and 433, are connected to respective outputs from each of the three counters in order to provide separate pulses whenever the total count reaches 90, 180 and 270 respectively. The 90° pulse produced by AND gate 431 is applied to the set input of flip-flop 437 thereby causing its Q output to assume a high level. If the aircraft is flying on any radial between 90° and 270° removed from the selected radial, then a synchronized variable pulse appears on line 169 before the appearance of a 270° pulse on lead 435. Consequently, the synchronized variable pulse enables AND gates 439 and 441 which route the high and low levels present on the Q and Q̄ outputs of flip-flop 437 to the set (S) and reset (R) inputs of flip-flop 445. This causes flip-flop 445 to set its Q output to a high level which, in turn, through resistor 451 switches transistor 461 on, thereby energizing only "To" indicator 471. Alternatively, whenever the aircraft is flying any radial within ±90° of the selected radial, then flip-flop 437 remains in a reset condition (reset by the most recent 270° pulse produced by AND gate 433), whenever a synchronized variable pulse appears on line 169. Consequently, this variable pulse, via AND gates 439 and 441, causes flip-flop 445 to be reset wherein its Q̄ output assumes a high level state and its Q output assumes a low level state. Consequently, this high level Q̄ output applied through resistor 453 switches transistor 463 on which, in turn, only energizes "From" indicator 473. The remainder of the circuitry shown at the bottom of FIG. 4 and comprised of three ÷10 counters 481, 483 and 485, AND gates 487 and 488 and flip-flop 489 generates the "VAR+90° square wave," which is applied via lead 491 to the circuitry shown in FIG. 2. This square wave represents a squared version of the 30 Hz variable sine wave which has been phase delayed by 90°. This square waveform is generated in a manner nearly identical to that in which the "To/From"0 selection signal (Q output of flip-flop 437) is generated with the sole exception being that the three ÷10 counters 481, 483 and 485 are all simultaneously reset to zero in response to the occurrence of each synchronized variable pulse appearing on lead 169.

Furthermore, the OBS inputs to the VOR receiver need not be generated only by manual OBS switches but instead can be remotely produced by any digital device, such as a navigation computer, telemetry circuit or any other external digital circuit. Likewise, the digital omni-bearing information generated by the VOR receiver is not limited to being applied to visual displays, but in fact can be used in digital form as input to any external digital device, such as a navigation computer, telemetry equipment or other digital circuit. Also, the left/right course deviation signal, as well as the "To/From" signals can also be utilized in a variety of forms different from that shown above in order to appropriately interface the VOR receiver to various external digital devices. Consequently, the ease with which both remote navigation information can be read into and highly accurate navigation information can be obtained from a VOR receiver embodying the present invention makes this receiver particularly suitable for applications involving missiles and/or remotely piloted aircraft.

It will be understood by those skilled in the art that many modifications and variations of the present invention may be made without departing from the spirit and the scope thereof.

What is claimed is:

1. In a very high frequency omni-range (VOR) receiver of the type wherein an incoming VOR signal is comprised of both a reference signal and a variable signal, apparatus for producing navigation information in response to said reference and variable signals comprising:

a crystal oscillator for producing a crystal oscillator signal;

first means for generating, in response to said reference signal and said crystal oscillator signal, a synchronized reference pulse stream being in substantially phase synchronized relationship with said crystal oscillator signal;

second means for generating a stream of timing pulses which are in a substantially phase synchronized relationship to said synchronized reference pulse stream;

means for producing, in response to said timing pulses and to said synchronized reference pulse stream, a stream of OBS pulses which are phase-shifted by an amount representative of a preselected radial emitted by a predetermined VOR station; and third means for generating, in response to said variable signal and said crystal oscillator signal, a synchronized variable pulse stream being in substantially phase synchronized signal relationship with said crystal oscillator signal;

means, operative in response to said timing pulses, said OBS pulse stream, and said synchronized variable pulse stream, for producing a voltage indicative of course deviation between an actual course and said preselected radial.

2. The apparatus in claim 1 wherein said second generating means is comprised of means operative, in response to said timing pulses and said synchronized reference pulse stream, for maintaining the frequency of said timing pulses at substantially a pre-set multiple of the frequency of said synchronized reference pulse stream.

3. The apparatus in claim 2 further comprising:

means, responsive to said timing pulses, said OBS pulse stream and to said synchronized variable pulse stream, for producing at least one To/From signal indicative of whether the actual course is in a direction towards or away from the predetermined VOR station.

4. The apparatus in claim 3 further comprising:

means, responsive to said timing pulses, said synchronized reference pulse stream and said synchronized variable pulse stream, for ascertaining any phase delay between the occurrence of both a pulse in said synchronized reference pulse stream and a successive pulse in said synchronized variable pulse stream and, in response thereto, providing a signal indicative of the actual course.

5. The apparatus in claim 4 wherein said producing means is comprised of:

means for providing digital information representative of said preselected radial;

means for counting said digital information to a predetermined value in response to said timing pulses and for producing a pulse in said OBS pulse stream whenever said count reaches a predetermined value; and means for initiating said counting at the occurrence of a pulse in said synchronized reference pulse stream.

6. The apparatus in claim 5 wherein said ascertaining and providing means is further comprised of:

means responsive to said timing pulse stream, said synchronized variable pulse stream and said synchronized reference pulse stream for counting the timing pulses occurring between the occurrence of a pulse in said synchronized variable pulse stream and a successive pulse in said synchronized reference pulse stream; and means responsive to said count for producing a signal having a value indicative of the actual course.

7. The apparatus in claim 6 wherein the To/From signals producing means is comprised of:

means responsive to said OBS signal and said timing pulses for counting the number of timing pulses occurring between the successive pulses in said OBS signal;

means, responsive to at least one preselected value of the counted number, for generating an output associated therewith; and means responsive to said output for producing said To/From signal.

8. The apparatus in claim 1 wherein said first generating means further comprises:

means, responsive to said reference signal, for averaging said reference signal over a preset time interval to produce an average reference signal; and means, connected to said averaging means, for producing said synchronized reference pulse stream in response to said averaged reference signal.

9. The apparatus of claim 1 wherein said third generating means further comprises:

means, responsive to said variable signal, for averaging said variable signal over a preset time interval to produce an average variable signal; and means, connected to said averaging means, for producing said synchronized variable pulse stream in response to said averaged variable signal.

10. In a very high frequency omni-range (VOR) receiver of the type wherein an incoming VOR signal is comprised of both a reference signal and a variable signal, apparatus for producing navigation information in response to said reference and variable signals comprising:

a crystal oscillator for producing a crystal oscillator signal;

first means for generating, in response to said reference signal and said crystal oscillator signal, a synchronized reference pulse stream being in substantially phase synchronized relationship with said crystal oscillator signal;

second means for generating a stream of timing pulses which are in a substantially phase synchronized relationship to said synchronized reference pulse stream and are maintained at a frequency which is substantially a pre-set multiple of the frequency of said synchronized reference pulse stream;

means for providing digital information representative of a preselected radial;

means for counting said digital information to a predetermined value in response to said timing pulses and for producing a pulse in an OBS pulse stream whenever said count reaches said predetermined value;

means for initiating said counting at the occurrence of a pulse in said synchronized reference pulse stream;

third means for generating, in response to said variable signal and said crystal oscillator signal, a synchronized variable pulse stream being in substantially phase synchronized signal relationship with said crystal oscillator signal;

means, operative in response to said timing pulses, said OBS pulse stream and said synchronized variable pulse stream, for determining any phase difference existing between said OBS pulse stream and said synchronized variable pulse stream; and means, responsive to said phase difference for producing a voltage indicative of course deviation between an actual course and said preselected radial.

11. The apparatus in claim 10 further comprising:

means, responsive to said timing pulses, said OBS pulse stream and to said synchronized variable pulse stream, for producing at least one To/From signal indicative of whether the actual course is in a direction towards or away from the predetermined VOR station.

12. The apparatus in claim 11 further comprising:

means, responsive to said timing pulses, said synchronized reference pulse stream and said synchronized variable pulse stream, for ascertaining any phase delay between the occurrence of both a pulse in said synchronized reference pulse stream and a successive pulse in said synchronized variable pulse stream and, in response thereto, providing a signal indicative of the actual course.

13. The apparatus of claim 12 wherein said ascertaining and providing means is further comprised of:

means, responsive to said timing pulse stream, said synchronized variable pulse stream and said synchronized reference pulse stream, for counting the timing pulses occurring between the occurrence of a pulse in said synchronized variable pulse stream and a successive pulse in said synchronized reference pulse stream; and means, responsive to said count for producing a signal having a value indicative of the actual course.

14. The apparatus of claim 13 wherein the To/From signals producing means is comprised of:

means, responsive to said OBS signal and said timing pulses for counting the number of timing pulses occurring between the successive pulses in said OBS signal;

means, responsive to at least one preselected value of the counted number, for generating an output associated therewith; and means, responsive to said output for producing said To/From signal.

15. The apparatus in claim 10 wherein said first generating means further comprises:

means, responsive to said reference signal, for averaging said reference signal over a preset time interval to produce an average reference signal; and means, connected to said averaging means, for producing said synchronized reference pulse stream in response to said averaged reference signal.

16. The apparatus of claim 10 wherein said third generating means further comprises:

means, responsive to said variable signal, for averaging said reference signal over a preset time interval to produce an average variable signal; and means, connected to said averaging means, for producing said synchronized variable pulse stream in response to said averaged variable signal.

* * * * *